(12) United States Patent
Pfizenmaier et al.

(10) Patent No.: US 11,351,878 B2
(45) Date of Patent: Jun. 7, 2022

(54) ELECTRIC VEHICLE WITH HEATING ELEMENT AND ON-BOARD CHARGER

(71) Applicant: Dr. Ing. h.c. F. Porsche Aktiengesellschaft, Stuttgart (DE)

(72) Inventors: Tim Pfizenmaier, Leonberg (DE); Florian Mayer, Freiberg am Neckar (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 24 days.

(21) Appl. No.: 16/940,463

(22) Filed: Jul. 28, 2020

(65) Prior Publication Data

US 2021/0031641 A1 Feb. 4, 2021

(30) Foreign Application Priority Data

Jul. 30, 2019 (DE) ..................... 10 2019 120 530.1

(51) Int. Cl.
*B60L 53/22* (2019.01)
*B60L 58/27* (2019.01)

(52) U.S. Cl.
CPC ............... *B60L 53/22* (2019.02); *B60L 58/27* (2019.02); *B60L 2210/12* (2013.01); *B60L 2210/14* (2013.01); *B60L 2210/30* (2013.01)

(58) Field of Classification Search
CPC ...... B60L 53/22; B60L 58/27; B60L 2210/30; B60L 2210/14; B60L 2210/12; B60L 1/02; B60L 2210/10; B60L 2240/547; Y02T 90/14; Y02T 10/7072; Y02T 10/70; B60H 1/2221; B60H 1/2225; F24H 1/0018; F24H 3/002; H05B 3/0019; H02J 7/00; B60Y 2200/91
USPC ........................................................ 320/104
See application file for complete search history.

(56) References Cited

U.S. PATENT DOCUMENTS

| 6,040,561 | A | * | 3/2000 | Murty | ................... B60L 3/0069 219/494 |
|---|---|---|---|---|---|
| 7,889,524 | B2 | | 2/2011 | Lee et al. | |
| 2009/0033294 | A1 | * | 2/2009 | Odajima | ............... H02J 7/1415 320/166 |
| 2014/0021921 | A1 | * | 1/2014 | Thommes | .............. H02H 3/332 320/109 |
| 2014/0091763 | A1 | * | 4/2014 | Thommes | ................. H02J 7/04 320/109 |
| 2015/0001927 | A1 | * | 1/2015 | Han | ....................... B60L 50/40 307/10.7 |
| 2018/0241337 | A1 | | 8/2018 | Zou et al. | |

FOREIGN PATENT DOCUMENTS

DE 10 2018 103 345 8/2018

* cited by examiner

*Primary Examiner* — Paul Dinh
(74) *Attorney, Agent, or Firm* — Gerald E. Hespos; Michael J. Porco; Matthew T. Hespos

(57) ABSTRACT

An electric vehicle (100) has an on-board charger (1) for charging a high-voltage battery (2) of the electric vehicle (100) and a heating element (4). The on-board charger (1) has an intermediate circuit capacitor (3) in an intermediate circuit (3'), and the heating element (4) is connected electrically to the intermediate circuit (3').

14 Claims, 2 Drawing Sheets

ELECTRIC VEHICLE WITH HEATING ELEMENT AND ON-BOARD CHARGER

CROSS REFERENCE TO RELATED APPLICATION

This application claims priority under 35 USC 119 to German Patent Appl. No. 10 2019 120 530.1 filed on Jul. 30, 2019, the entire disclosure of which is incorporated herein by reference.

BACKGROUND

Field of the Invention

The invention relates to an electric vehicle with an on-board charger for charging a high-voltage battery of the electric vehicle and a heating element. The on-board charger has an intermediate circuit capacitor in an intermediate circuit.

Related Art

There is a need to provide heating elements in modern electric vehicles. These heating elements, for example, supply heat to the heating system of the passenger compartment of the electric vehicle and/or are used to control the temperature of a battery of the electric vehicle. The heating element normally is supplied with energy by a high-voltage battery of the electric vehicle as an additional individual component. High-frequency switching of the heating element may lead to current and voltage ripple in the on-board power system of the electric vehicle. The ripple has to be reduced, in a burdensome manner, using EMC filters.

An object of the invention is to provide an electric vehicle that does not exhibit the above-described disadvantages of the prior art, but rather makes it possible to reduce the current and voltage ripple caused by the switching of the heating element.

SUMMARY

The invention relates to an electric vehicle with an on-board charger for charging a high-voltage battery of the electric vehicle and a heating element. The on-board charger has an intermediate circuit capacitor in an intermediate circuit. The heating element is connected electrically to the intermediate circuit.

The intermediate circuit capacitor of the electric vehicle allows current and/or voltage ripple arising at the electrical inputs and outputs of the heating element during switching of the heating element to be attenuated. As a result, additional EMC filters can be considerably smaller or may be dispensed with completely.

An on-board charger within the meaning of the invention is a charger arranged in the electric vehicle for charging or discharging the high-voltage battery of the electric vehicle. The on-board charger can be a charger for charging or discharging the high-voltage battery of the electric vehicle from or to an external power grid. The on-board charger may have an AC-to-DC converter and a DC-to-DC converter. The intermediate circuit is arranged between the AC-to-DC converter and the DC-to-DC converter. An electric vehicle within the meaning of the invention is a motor vehicle with an electric machine for generating traction. Electric vehicles therefore comprise purely electrically driven motor vehicles and those that also have a combustion engine in addition to an electric machine for generating traction, that is to say hybrid vehicles.

According to one embodiment, the heating element is a water heater. The water heater can generate heat easily through electric current, and the generated heat can be transported quickly and precisely. The water heater can have a heating resistor for conductive heating, and the heating resistor can heat the water. As an alternative, the heating element may be designed as an oil heater or air heater.

The heating element may be connected in parallel with the intermediate circuit capacitor. This allows excellent attenuation of current and/or voltage ripple that arises when switching the heating element.

The heating element may be designed to operate with a buck stage and/or a boost stage of the on-board charger. This reduces the necessary number of required components of the electric vehicle and thus saves on costs, weight and installation space. It is conceivable for the DC-to-DC converter of the on-board charger to contain the buck stage and/or the boost stage. It is conceivable for the DC-to-DC converter of the on-board charger to be bidirectional and hence able to be operated in two directions. Thus, the buck stage and/or the boost stage can be used to convert current and voltage during charging of the high-voltage battery, and also for the buck stage and/or the boost stage to be operated by the high-voltage battery to convert current and voltage during operation of the heating element while supplying the heating element with electrical energy. A buck stage within the meaning of this disclosure is a step-down converter for reducing a voltage. A boost stage within the meaning of this disclosure is a step-up converter for increasing a voltage. It is conceivable for the DC-to-DC converter of the on-board charger to have a buck-boost stage that is able to be used bidirectionally. A buck-boost stage within the meaning of this disclosure is a converter that is able to be used as a step-down converter for reducing a voltage or as a step-up converter for increasing the voltage.

The on-board charger may have a power factor correction filter. This allows the power factor to be corrected when charging the high-voltage battery. The power factor correction filter may be an active power factor correction filter or a passive power factor correction filter and may be integrated into the AC-to-DC converter.

The on-board charger may be designed to charge and discharge the high-voltage battery. Thus, the high-voltage battery can be charged by the on-board charger and also can be discharged. For example, the on-board charger can be designed to discharge the high-voltage battery into an external power grid. As an alternative or in addition thereto, it is conceivable for the on-board charger to be designed to discharge the high-voltage battery by operating the heating element.

The on-board charger can be designed for connection to an external power grid and to supply the heating element with electrical energy from the external power grid. Thus, the heating element can be operated without discharging the high-voltage battery. This is advantageous, for example, in cold weather and with an electric vehicle connected to a charging station as auxiliary heater.

The on-board charger can be designed to supply the heating element with electrical energy from the high-voltage battery. This makes it possible to supply the heating element with a constant voltage regardless of the state of charge of the high-voltage battery. The DC-to-DC converter of the on-board charger in this case may be designed to adjust the voltage present at the heating element in a stable manner.

Accordingly, additional converters for the stable operation of the heating element are not required, thereby saving on costs, weight and installation space.

The heating element may be designed to heat a passenger compartment of the electric vehicle. This allows a comfortable journey in the electric vehicle.

The heating element may be designed to heat the high-voltage battery and to keep the temperature of the high-voltage battery above a minimum temperature in cold weather, thereby benefiting the performance of the high-voltage battery and the range of the electric vehicle. The charging performance of the high-voltage battery is additionally able to be boosted by the heating.

The on-board charger may have a heat exchanger for transferring heat to the heating element, and/or a heat exchanger for transferring heat from the intermediate circuit capacitor to the heating element and/or a heat exchanger for transferring heat from an AC-to-DC converter of the on-board charger to the heating element and/or a heat exchanger for transferring heat from a DC-to-DC converter of the on-board charger to the heating element. Thus, it possible to use waste heat arising at the on-board charger thereby saving energy.

Further details, features and advantages of the invention will emerge from the drawings and from the following description of preferred embodiments on the basis of the drawings. Here, the drawings illustrate merely exemplary embodiments of the invention, which do not restrict the concept of the invention.

DETAILED DESCRIPTION

Figure 1:
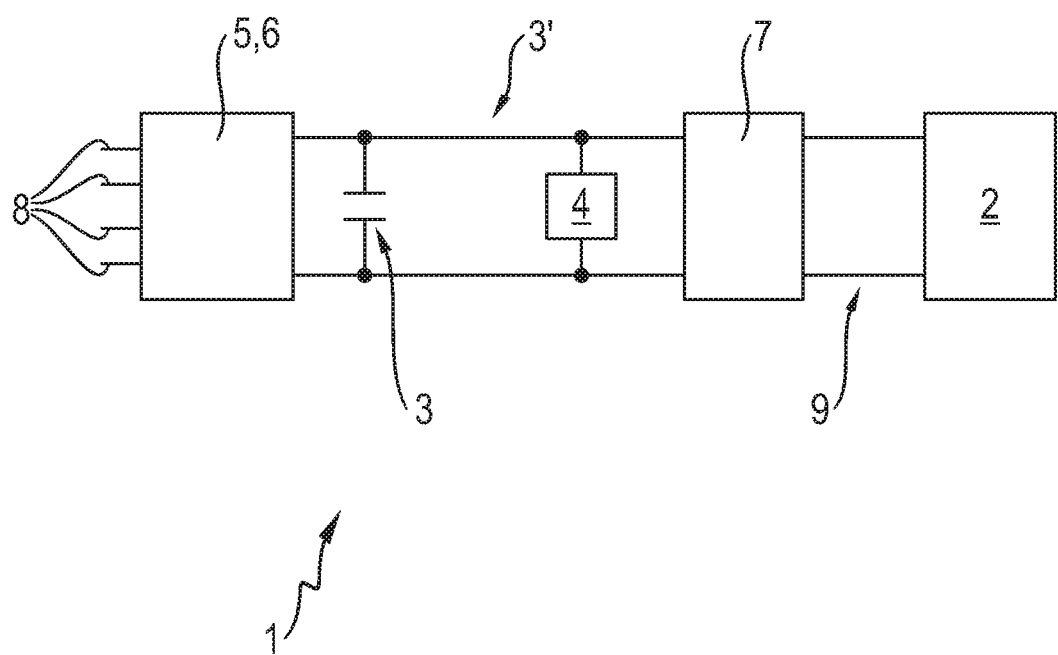
FIG. 1 schematically shows an on-board charger and a heating element of an electric vehicle according to one exemplary embodiment of the present invention.

FIG. 1 schematically illustrates an on-board charger 1 and a heating element 4 of an electric vehicle 100 according to one exemplary embodiment of the present invention. The on-board charger 1 is designed for connection to an external power grid 8. An AC voltage from the external power grid 8 is rectified by way of an AC-to-DC converter 6. An intermediate circuit 3' with an intermediate circuit capacitor 3 is arranged between the AC-to-DC converter 6 and a DC-to-DC converter 7 of the on-board charger 1. The DC-to-DC converter 7 converts the rectified voltage such that it is able to be provided via an on-board power system 9 of the electric vehicle in order to charge a high-voltage battery 2. The AC-to-DC converter 6 has a power factor correction filter 5 for connection to the external power grid 8.

A heating element 4 in the form of a water heater is furthermore arranged in the intermediate circuit 3'. The heating element 4 is connected in parallel with the intermediate circuit capacitor 3. The heating element 4 is switched in order to set a heating power thereof. The current and voltage ripple arising in the process are attenuated by the intermediate circuit capacitor 3 such that burdensome EMC filtering is not required at the heating element 4 and no noteworthy interference caused by ripple currents arises in the on-board power system 9.

The heating element 4 may be supplied with electrical energy by the external power grid 8 when the on-board charger 1 is connected to the external power grid 8. The DC-to-DC converter 7 is however furthermore also designed as a bidirectional DC-to-DC converter, such that the heating element 4 is also able to be supplied with electrical energy by the high-voltage battery 2. In this case, the voltage present at the heating element 4 is adjusted by the DC-to-DC converter 7 such that it is always the same independent of the state of charge of the high-voltage battery 2. In addition to the possibility of discharging the high-voltage battery 2 into the external power grid 8, which makes sense for example when using the electric vehicle as a buffer store for electrical energy, the possibility thus arises of discharging the high-voltage battery 2 through the heating element 4. The DC-to-DC converter 7 has a buck-boost stage that is used both to charge and discharge the high-voltage battery 2 and to supply the heating element 4 with electrical energy through the high-voltage battery 2. The heating element 4 therefore does not require any dedicated buck or boost stage, which saves on installation space, weight and costs.

For the sake of clarity, an illustration is not given here of heat exchangers that transfer waste heat from the intermediate circuit capacitor 3, from the AC-to-DC converter 6 and from the DC-to-DC converter 7 to the heating element 4 and thus contribute to boosting the efficiency of the electric vehicle.

Figure 2:
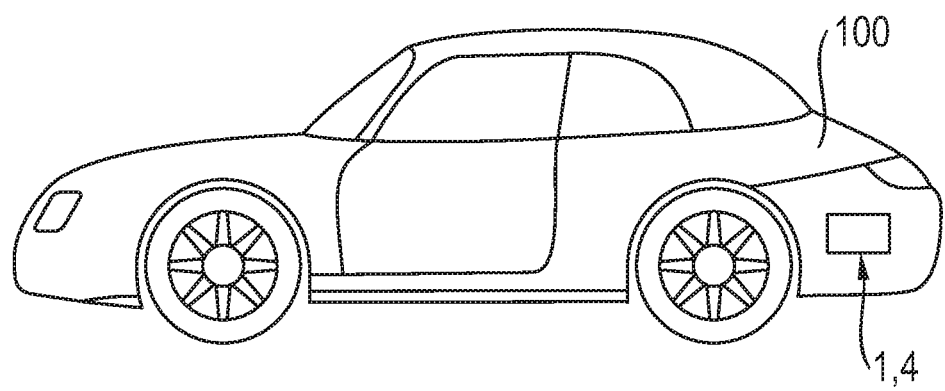
FIG. 2 schematically shows an electric vehicle according to one exemplary embodiment of the present invention.

FIG. 2 schematically illustrates an electric vehicle 100 according to one exemplary embodiment of the present invention. The electric vehicle has the on-board charger 1 shown in FIG. 1 with the heating element 4 arranged in the intermediate circuit 3'. The heating element 4 is designed to heat a passenger compartment and a high-voltage battery, not illustrated here, of the electric vehicle 100.

What is claimed is:

1. An electric vehicle comprising:
   a high-voltage battery; and
   an on-board charger having:
      an AC-to-DC converter configured for connection to an external power grid for charging the high-voltage battery of the electric vehicle,
      a bidirectional DC-to-DC converter having a buck stage, the bidirectional DC-to-DC converter being between the AC-to-DC converter and the high-voltage battery and being connected electrically in parallel to the AC-to-DC converter and the high-voltage battery,
      a heating element between the AC-to-DC converter and the DC-to-DC converter, and
      an intermediate circuit capacitor in an intermediate circuit between the AC-to-DC converter and the heating element, and the heating element is connected electrically in parallel to the intermediate circuit capacitor.

2. The electric vehicle of claim 1, wherein the heating element is a water heater.

3. The electric vehicle of claim 1, wherein the on-board charger has a power factor correction filter.

4. The electric vehicle of claim 1, wherein the on-board charger is designed to charge and discharge the high-voltage battery.

5. The electric vehicle of claim 1, wherein the on-board charger is designed to supply the heating element with electrical energy from the external power grid.

6. The electric vehicle of claim 5, wherein the on-board charger is designed to supply the heating element with electrical energy from the high-voltage battery.

7. The electric vehicle of claim 1, wherein the heating element is designed to heat a passenger compartment of the electric vehicle.

8. The electric vehicle of claim 1, wherein the heating element is designed to heat the high-voltage battery.

9. The electric vehicle of claim 1, wherein the on-board charger has a heat exchanger for transferring heat to the heating element.

10. The electric vehicle of claim 1, wherein the on-board charger has a heat exchanger for transferring heat from the intermediate circuit capacitor to the heating element.

11. The electric vehicle of claim 1, wherein the on-board charger has a heat exchanger for transferring heat from the AC-to-DC converter of the on-board charger to the heating element.

12. The electric vehicle of claim 1, wherein the on-board charger has a heat exchanger for transferring heat from the DC-to-DC converter of the on-board charger to the heating element.

13. The electric vehicle of claim 1, wherein the heating element is an oil heater.

14. The electric vehicle of claim 1, wherein the heating element is an air heater.

\* \* \* \* \*